United States Patent
Davidson, Sr. et al.

(10) Patent No.: US 7,428,910 B2
(45) Date of Patent: Sep. 30, 2008

(54) BREATHABLE FIRE HYDRANT ROD

(75) Inventors: Tom R. Davidson, Sr., Griffin, GA (US); Anthony Ferrari, McDonough, GA (US); David M. Walden, Sharpsburg, GA (US); Matthew J. Rose, Macon, GA (US)

(73) Assignee: Davidson Hydrant Technologies, Inc., Sunnyside, GA (US)

(*) Notice: Subject to any disclaimer, the term of this patent is extended or adjusted under 35 U.S.C. 154(b) by 202 days.

(21) Appl. No.: 11/372,947

(22) Filed: Mar. 9, 2006

(65) Prior Publication Data

US 2006/0201551 A1 Sep. 14, 2006

Related U.S. Application Data

(63) Continuation-in-part of application No. 10/997,733, filed on Nov. 23, 2004, now Pat. No. 7,055,544, which is a continuation-in-part of application No. 10/309,646, filed on Dec. 4, 2002, now Pat. No. 6,868,860.

(51) Int. Cl.
*E03B 9/02* (2006.01)

(52) U.S. Cl. .......................... 137/299; 137/272; 137/540

(58) Field of Classification Search ................. 137/299, 137/272, 539, 540
See application file for complete search history.

(56) References Cited

U.S. PATENT DOCUMENTS

| | | |
|---|---|---|
| 154,087 A | 8/1874 | Roberts |
| 726,369 A | 4/1903 | Sullivan |
| 1,562,223 A | 11/1925 | Gannestad |
| 1,601,993 A | 10/1926 | Blake |
| 2,083,319 A | 6/1937 | Daviet |
| 2,109,187 A | 2/1938 | Vogel |
| 2,244,993 A | 6/1941 | Hollifield |
| 2,515,770 A | 7/1950 | Gronberg |
| 2,580,199 A | 12/1951 | Schmid |
| 3,017,896 A | 1/1962 | Papacek |
| 3,035,609 A | 5/1962 | Dyer |
| 3,158,170 A | 11/1964 | Tubbs |
| 3,294,109 A | 12/1966 | Smith |

(Continued)

FOREIGN PATENT DOCUMENTS

CH 191132 3/1937

(Continued)

OTHER PUBLICATIONS

International Search Report, May 4, 2004, Issued by European Patent Office for PCT US03/37681.

(Continued)

*Primary Examiner*—Kevin L Lee
(74) *Attorney, Agent, or Firm*—Kilpatrick Stockton LLP

(57) ABSTRACT

The present invention relates to methods and devices for providing a fire hydrant actuator rod with additional structure for allowing air to reach the area of a fire hydrant below a secondary valve. Various embodiments include an actuator rod with openings and hollow portions and configured to provide air from the area of a hydrant above the secondary valve to the area of a hydrant below a secondary valve. In some embodiments of the present invention, a check valve is provided with the actuator rod that is adapted to prevent the flow of fluid in at least one direction.

33 Claims, 9 Drawing Sheets

U.S. PATENT DOCUMENTS

| | | | |
|---|---|---|---|
| 3,475,978 | A | 11/1969 | Dunton |
| 3,566,905 | A | 3/1971 | Noland |
| 3,586,019 | A | 6/1971 | Thomas et al. |
| 3,770,000 | A * | 11/1973 | Murdock et al. ............ 137/217 |
| 3,939,861 | A | 2/1976 | Thompson |
| 3,952,770 | A | 4/1976 | Botnick |
| 3,980,097 | A | 9/1976 | Ellis |
| 4,139,931 | A | 2/1979 | Royce |
| 4,393,891 | A | 7/1983 | Snoek et al. |
| 4,440,190 | A | 4/1984 | Barbe |
| 4,475,570 | A | 10/1984 | Pike et al. |
| 4,602,654 | A | 7/1986 | Stehling et al. |
| 4,791,952 | A | 12/1988 | Laurel |
| 4,813,378 | A * | 3/1989 | Lapp ........................ 119/73 |
| 4,909,270 | A | 3/1990 | Enterante et al. |
| 5,029,603 | A | 7/1991 | Ackroyd |
| 5,129,416 | A | 7/1992 | Ackroyd |
| 5,549,133 | A | 8/1996 | Sigelakis |
| 5,609,179 | A | 3/1997 | Knapp |
| 5,622,202 | A | 4/1997 | Etter et al. |
| 6,401,745 | B1 | 6/2002 | Corder |
| 6,488,048 | B2 | 12/2002 | Kuhmayer et al. |
| 6,769,446 | B1 * | 8/2004 | Ball et al. ................... 137/540 |
| 6,868,860 | B2 | 3/2005 | Davidson |
| 6,910,495 | B2 | 6/2005 | Lafalce |
| 7,055,544 | B2 | 6/2006 | Davidson |
| 7,128,083 | B2 | 10/2006 | Fleury, Jr. |
| 7,174,911 | B2 | 2/2007 | Davidson |
| 7,240,688 | B2 | 7/2007 | Davidson |
| 2005/0067016 | A1 | 3/2005 | Wigzell |

FOREIGN PATENT DOCUMENTS

| | | |
|---|---|---|
| CH | 0 113 913 A1 | 7/1984 |
| CH | 675139 A | 8/1990 |
| DE | 229997 C | 1/1911 |
| DE | 236 645 | 11/1911 |
| DE | 639655 C | 12/1936 |
| DE | 2237019 | 2/1973 |
| DE | 19803901 | 8/1999 |
| EP | 0 463 702 A1 | 1/1992 |
| EP | 1 010 821 A1 | 6/2000 |
| EP | 1010822 | 6/2000 |
| FR | 2773373 | 7/1999 |
| WO | WO 2004/051009 | 6/2004 |

OTHER PUBLICATIONS

International Preliminary Examination Report, Jan. 17, 2005, Issued by European Patent Office for PCT/US03/37681.

PCT/US2007/063068 Invitation to Pay Fees and Partial International Search Report mailed Aug. 2, 2007.

PCT/US2007/063064 International Search Report and Written Opinion mailed Jul. 10, 2007.

* cited by examiner

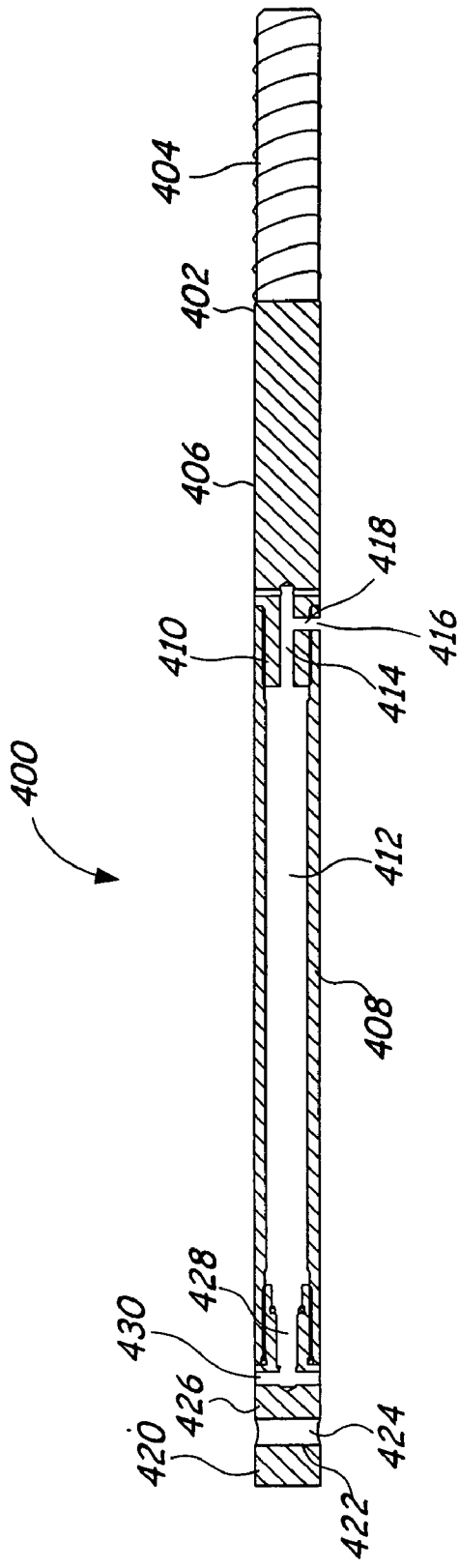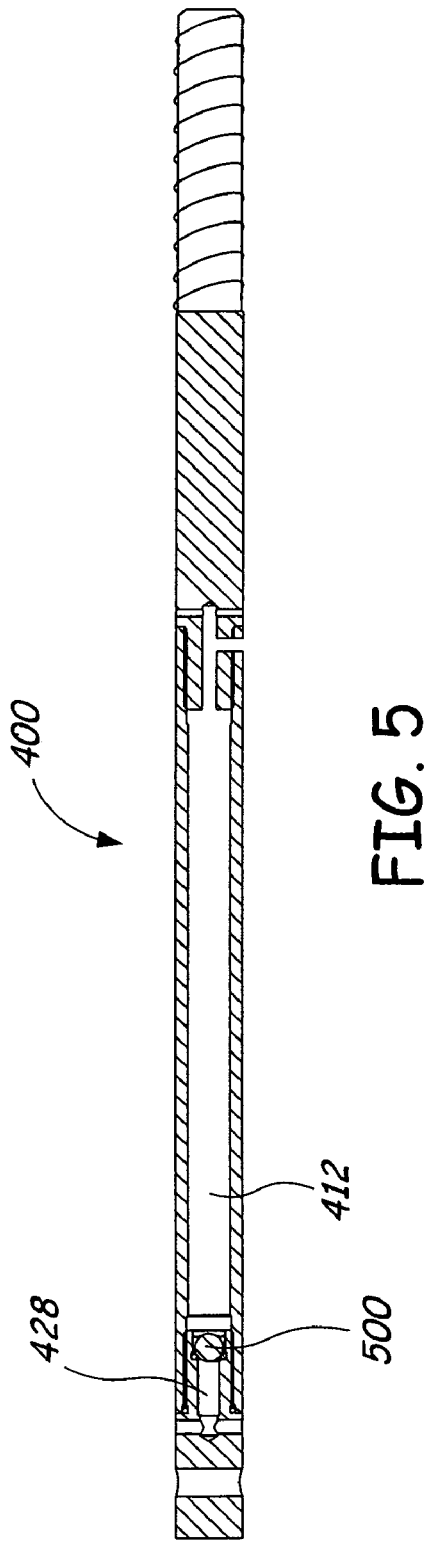

BREATHABLE FIRE HYDRANT ROD

CROSS REFERENCE TO RELATED APPLICATIONS

This application is a continuation-in-part of U.S. patent application U.S. Ser. No. 10/997,733, entitled "Fire Hydrant With Second Valve" and filed Nov. 23, 2004, now U.S. Pat. No. 7,055,544 which is a continuation-in-part of U.S. patent application U.S. Ser. No. 10/309,646, entitled "Fire Hydrant With Second Valve" and filed Dec. 4, 2002, now U.S. Pat. No. 6,868,860 the entire contents of each of which are hereby incorporated by this reference.

TECHNICAL FIELD OF INVENTION

Various aspects and embodiments of the present invention relate to actuator rods for fire hydrants having a secondary valve configured to allow excess water to drain out of the hydrant.

BACKGROUND OF THE INVENTION

Conventional fire hydrants offer access to a municipal water supply in a manner which operatives with ill intent may appreciate. Briefly, conventional fire hydrants include at least one nozzle for coupling to a fire hose. A threaded cap closes off the nozzle when the hydrant is not in use. The hydrant also includes a hydrant valve which controls flow of water from the water supply to and through the hydrant, through the nozzle, and into the fire hose.

Conventionally, the barrel of the hydrant between the nozzle and the hydrant valve, which is in the lower portion of the hydrant, accommodates several gallons of fluid. Accordingly, it is possible to unscrew a nozzle cap, introduce gallons of toxin, reattach the nozzle cap and open the hydrant valve to allow the toxins to communicate with and flow by gravity and perhaps at least to some extent by Bernoulli's principle, into the municipal water supply, since when the nozzle cap is attached, water pressure from the water supply would not force the toxins back out of the hydrant.

U.S. patent application U.S. Ser. No. 11/265,051, entitled "Fire Hydrant With Second Valve," which is a continuation-in-part of U.S. patent application U.S. Ser. No. 10/309,646, entitled "Fire Hydrant With Second Valve," the entire contents of each of which are hereby incorporated by this reference. Briefly, these documents disclose a seat affixed to the interior cavity of the fire hydrant using an adhesive or mechanical means, and another secondary valve structure introduced between the nozzle and the hydrant valve which cooperates with the seat to make it more difficult or impossible to introduce toxins to a water supply through a fire hydrant. The valve structure prevents or substantially prevents the flow of water through the valve and thus closes off portions of the hydrant barrel when a nozzle is open but the hydrant valve is closed. Generally, the valve structure comprises a secondary valve, a seat, and biasing structure.

Generally, when the hydrant is used to provide water to extinguish fires, or otherwise, a nut on top of the fire hydrant is rotated in one direction to open the primary and secondary valves inside the fire hydrant barrel. Water flows through the hydrant and out the nozzle. When the need for the water no longer exists, the nut is rotated in a second direction closing the primary and secondary valve.

Water may remain in the fire hydrant cavity after the primary and secondary valves are closed. Some conventional fire hydrants provide a drain or weep hole at the base of the hydrant to allow the water in the fire hydrant to drain to the exterior of the hydrant. Water must drain from the hydrant to prevent water, in colder climates from freezing and damaging the hydrant Hydrants with a secondary valve not only prevent water and toxins from mixing, but also, in some instances, prevent atmospheric conditions from the hydrant barrel above the secondary valve to reach the area of the hydrant barrel below the secondary valve. Since air from the atmosphere does not reach the interior area of the hydrant below the secondary valve, the water may not, in some circumstances, drain or weep through the drain hole. Therefore, a need exists for a mechanism that allows water or other liquid to drain out the drain hole of a fire hydrant when the secondary valve is closed.

SUMMARY

Accordingly, various embodiments of the present invention provide devices to be included in a fire hydrant with a secondary valve that allows water or other liquid in the area of the hydrant barrel below the secondary valve to drain out the drain hole. In some embodiments of the present invention, an actuator rod is provided that includes a hollow portion, an opening between the hollow portion and the area of the hydrant above the secondary valve and an opening between the hollow portion and the area of the hydrant below the secondary valve. Air may reach the area below the secondary valve through the openings and hollow portion.

A check valve may be provided in some embodiments of the present invention and located in the actuator rod to prevent fluids, such as toxins, from entering the area of the hydrant below the secondary valve. In some embodiments, the check valve closes when a certain level of fluid pressure occurs in the hollow portion.

In some embodiments of the present invention a fire hydrant is provided having a barrel with an inner cavity, a primary valve to controllably restrict communication between the barrel and a water conduit, a secondary valve for controllably allowing liquid to flow through the barrel, a cap structure for controlling the primary and secondary valve, and an actuator rod extending from the cap structure to the primary and secondary valves. The actuator rod may include a first rod member between the cap structure and a breakaway structure and a second rod member between the breakaway structure and the primary valve. The first rod member may include a top portion with a first end for cooperating with the cap structure and a second end for connecting to a body portion, the second end having an opening and a hollow area extending from the opening. The first rod member may also include a body portion having a first end, second end, a hollow area extending the length of the body portion, and an opening at the first end that is essentially aligned with the top portion opening when the top portion is connected to the body portion. Additionally, the first rod member may include a bottom portion connectable to the body portion, the bottom portion having a first opening for connecting the bottom portion to the breakaway structure, a second opening, and a hollow area extending from the second opening. The first rod member may be adapted to allow air to flow between the bottom portion second opening and the top portion opening.

Some embodiments of the present invention may provide a fire hydrant actuator rod with a top portion having a first end to cooperate with a fire hydrant cap structure and a second end adapted to be connected to a body portion, an opening at the second end, and a hollow area extending from the opening. The actuator rod may also include a body portion having a first end, a second end, a hollow area extending the length of the body portion, and an opening at the first end for aligning with the top portion opening. A bottom portion may also be included in the actuator rod that is connectable to the body portion and having a first opening for connecting the bottom portion to the breakaway structure, a second opening, and a hollow area extending from the second opening. The actuator rod may be adapted to allow air to flow between the bottom portion second opening and the top portion opening.

In other embodiments of the present invention, a fire hydrant actuator rod is provided with a first portion between the fire hydrant cap structure and the breakaway structure with a groove in the outside surface of the actuator rod extending part of the length of the actuator rod. When installed in a fire hydrant, the groove preferably has a first portion above the secondary valve and a second portion below the secondary valve and preferably allows air to flow from the area of the hydrant interior above the secondary valve to the area below the secondary valve. A check valve is preferably located in the groove to prevent fluid from flowing from the area of the hydrant above the secondary valve to the area below the secondary valve when the ambient fluid pressure reaches a certain level.

In other embodiments of the present invention, a fire hydrant is provided having a secondary valve located between a fire hydrant cap structure and a primary valve. The secondary valve may include an opening having a check valve located in the opening to prevent fluid from flowing from the area above the secondary valve to the area below the secondary valve when the ambient pressure is above a certain amount. A check valve housing may also be located in the secondary valve opening, to which the check valve may be attached. The check valve housing preferably includes a hollow cavity, an opening in the portion above the secondary valve, and an opening in the portion below the secondary valve. The hollow cavity and openings may be configured to allow air to flow from the area above the secondary valve to the area below the secondary valve.

BRIEF DESCRIPTION OF THE DRAWINGS

FIG. 4 shows a cross-sectional view of the fire hydrant actuator rod shown in FIG. 2.

FIG. 5 shows a cross-sectional view of the actuator rod and check valve shown in FIG. 3.

DETAILED DESCRIPTION

Figure 1:
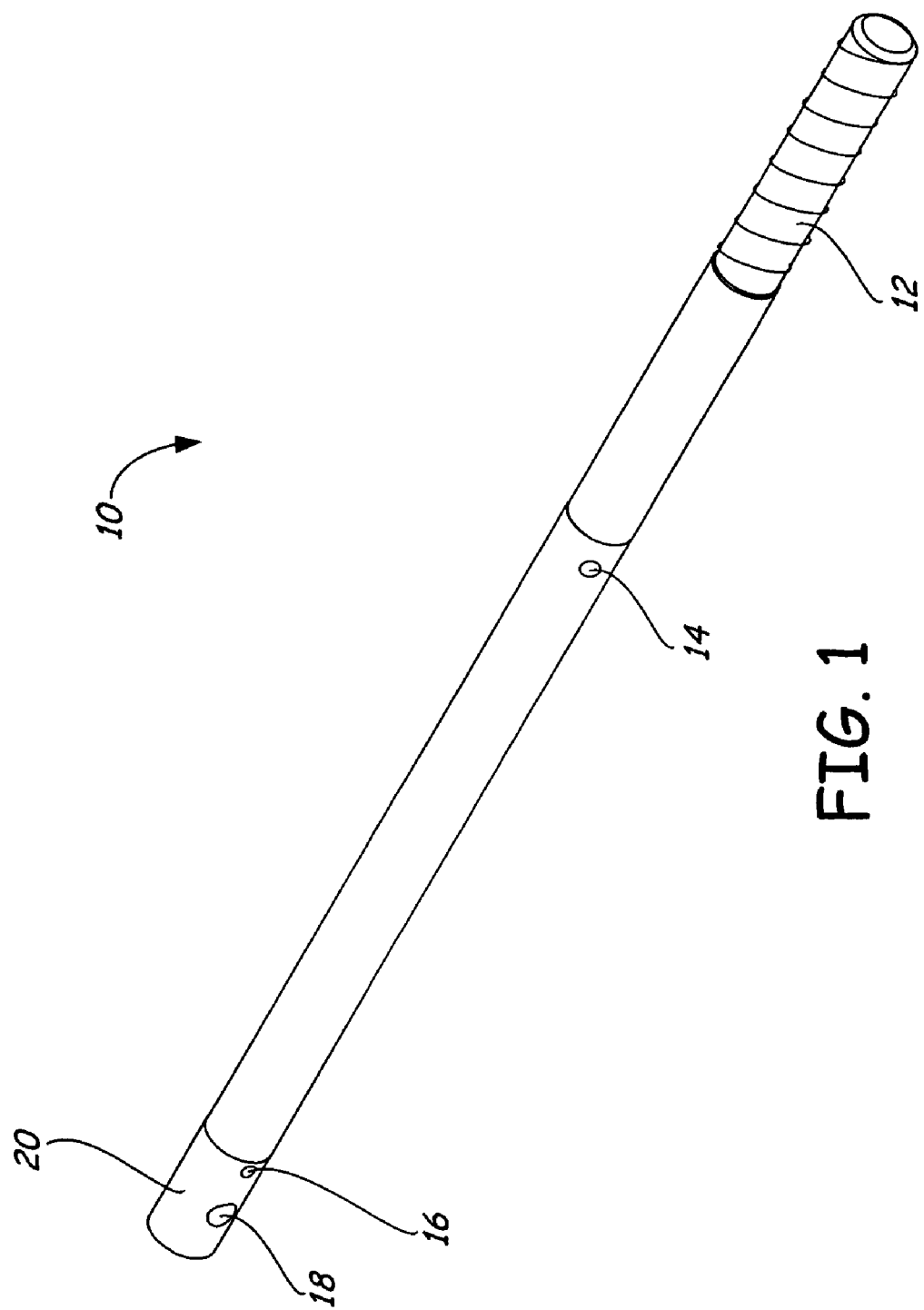
FIG. 1 shows a perspective view of an actuator rod according to one embodiment of the present invention.

FIG. 1 shows a fire hydrant actuator rod 10 with openings and hollow portions to allow air to flow between different areas of a hydrant interior according to one embodiment of the invention. The actuator rod 10 may include a first end 12 that is preferably threaded and cooperates with a fire hydrant cap structure to open and close the primary and secondary valves of the fire hydrant. The actuator rod 10 also includes a first opening 14 and a second opening 16. The first opening 14 may be located at any location along the rod as long as, after installation of the actuator rod into the fire hydrant, the opening 14 is between a fire hydrant secondary valve and the cap structure. The second opening 16 may be located at any location along the rod as long as, after installation of the actuator rod into the fire hydrant, the opening 16 is between a fire hydrant secondary valve and a fire hydrant primary valve.

The rod 10 may also include a hollow portion (not shown) that preferably extends, at least, from the first opening 14 to the second opening 16. The hollow portion and first 14 and second 16 openings may allow air to flow between the area of the hydrant interior defined by the secondary valve and the cap structure and the area of the hydrant interior defined by the secondary valve and the primary valve. In some embodiments of the present invention, the rod may also include a third opening 18 at a second end 20 to allow the second end 20 to be connected to a fire hydrant breakaway structure.

In some embodiments of the actuator rod 10, a check valve (not shown) is located in the hollow portion of the rod 10. The check valve is normally open, but closes if pressure above a certain level, preferably between 0.5-2.0 pounds per square inch (psi) above ambient pressure, is exerted on the check valve by liquid or solid material. Therefore, the check valve preferably prevents liquid or solid material, and especially toxic material introduced through a fire hydrant nozzle, from entering the area of the hydrant below the secondary valve.

The actuator rod 10 may be made by providing a rod, such as a steel rod or tube, with a first end 12 and second end 20. A hollow cavity is bored or otherwise formed in the areas of the rod so that it is preferably tubular. A first opening 14 is drilled or otherwise formed into the side of the rod near the first end 12 until the opening allows air to flow between the outside of the rod and the hollow cavity. A second opening 16 is drilled or otherwise formed in the second end 20 until the opening allows air to flow between the outside of the rod and the hollow cavity. In some embodiments of the present invention, a third opening 18 is drilled in the second end for connecting the rod to a fire hydrant breakaway structure. A first end 12 may also be threaded to be connected to a fire hydrant cap structure. The second end 20 may be reconnected to the first end 12 by, for example, welding the two components together.

Figure 2:
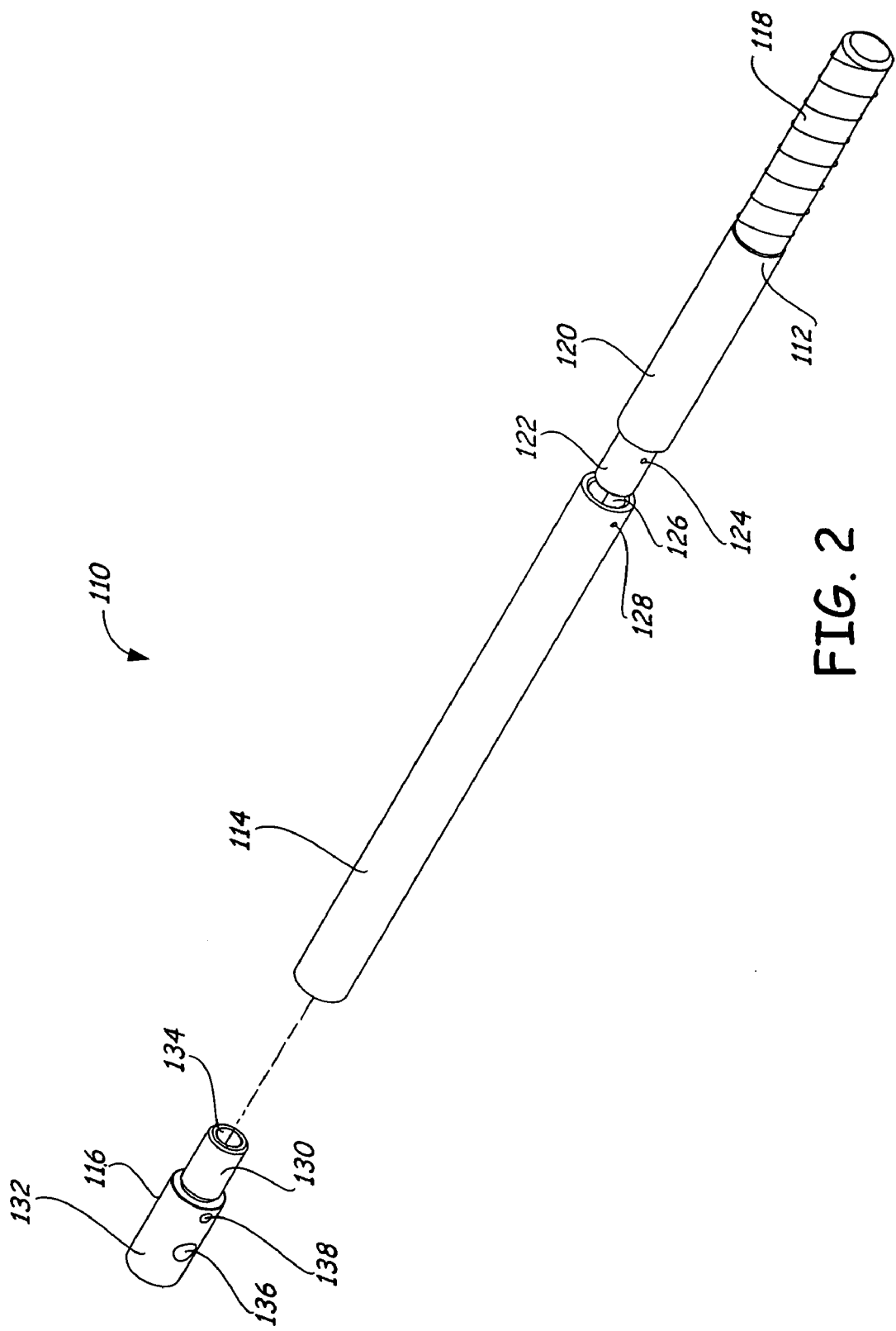
FIG. 2 shows an exploded view of an actuator rod according to one embodiment of the present invention.

FIG. 2 shows a fire hydrant actuator rod 110 according to one embodiment of the present invention having a top portion 112, body portion 114, and bottom portion 116. The top portion 112 includes a first end 118 that is preferably threaded in order to be connected to the nut of a fire hydrant cap structure and a second end 120 that is connectable to the body portion 114. The second end 120 may include an end member 122 that has at least one opening 124 on the side of the end member 122, a hollow cavity (not shown) extending from the opening 124, and a cross-sectional diameter that is preferably less than the body portion 114.

The body portion 114 may include a hollow area 126 that preferably extends the length of the body portion 114. The hollow area 126 preferably has a diameter for receiving the end member 122 of the top portion 112. An opening 128 may be provided in the side of the body portion 114 in a location such that the opening 128 is essentially aligned with the opening 124 of the top portion 112 when the top portion 112 and body portion 114 are connected. When the openings 124 and 128 are aligned, they preferably form an opening from the hollow area 126 to the area of the hydrant interior between the secondary valve and the cap structure.

The bottom portion 116 preferably includes a first end 130 for connecting to the body portion 114 and a second end 132 for connecting to a breakaway structure in the fire hydrant interior. The first end 130 may have a cross-sectional diameter that is less than the cross-sectional diameter of the body portion 114 and may be connectable to the body portion 114, at least partially, by inserting the first end 130 into the hollow area 126 of the body portion 114. The first end 130 may also have a hollow portion 134. The bottom portion second end 132 may include a first opening 136 for connecting the bottom portion 116 to a breakaway structure and a second opening 138 on the side of the second end 132 that allows air to flow between the hollow portion 134 to the area of the hydrant interior between the secondary valve and the primary valve.

When installed into a hydrant, the actuator rod 110 may allow air to flow between the area of the hydrant interior defined by the secondary valve and the cap structure and the area of the hydrant interior defined by the secondary valve and the primary valve through the openings 124, 128, and 138 and hollow areas 126 and 134.

Figure 3:
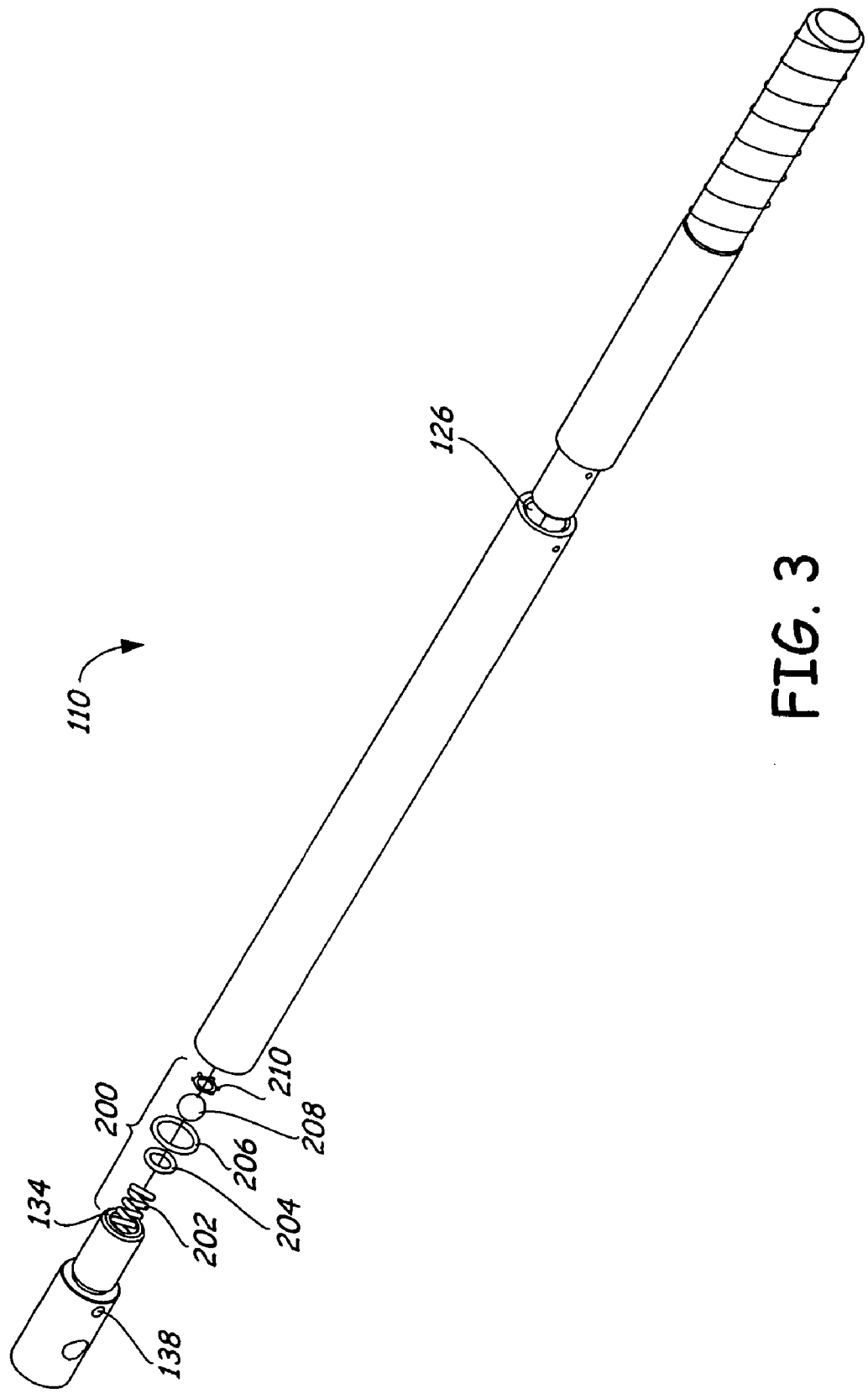
FIG. 3 shows an exploded view of the actuator rod shown in FIG. 2 with a check valve according to one embodiment of the present invention.

FIG. 3 shows the actuator rod 110 of FIG. 2 with an exploded view of a check valve 200 according to one embodiment of the invention. The check valve 200 preferably prevents the flow of water or fluids from the hollow body portion 126 to the bottom second portion opening 138. The check valve 200 in this particular embodiment is preferably located in the hollow area of the bottom rod portion and the body portion and may preferably include a spring 202, valve seat O-ring 204, an O-ring 206, a ball 208, and a retaining ring 210.

Once installed in the rod 110, the check valve is normally open and allows air to pass through the hollow areas 126, 134. If liquid or solid material is introduced into the hydrant cavity through a hydrant nozzle, such as a miscreant attempting to poison or otherwise damage the water supply, the liquid or solid material may enter the opening of the top portion 112 and body portion 114 and into the hollow body portion 126. The check valve 200 closes if the fluid pressure on the check valve 200 exceeds a certain level, thereby preventing the fluid from reaching the area of the hydrant interior between the secondary valve and primary valve.

FIG. 4 shows one embodiment of a fire hydrant actuator rod 400 cross-section according to the present invention. The actuator rod 400 includes a top portion 402 with a first end 404 that is preferably threaded in order to be connected to a fire hydrant cap structure. The top portion 402 may also include a second end 406 that is connected to a body portion 408. The second end 406 may include an end member 410 that has a diameter less than the body portion 408 and is adapted to be inserted into a hollow area 412 of the body portion 408. The end member 410 may also include a hollow area 414. The end member 410 and body portion 408 include openings 416, 418 that are aligned when the end member 410 is inserted into the body portion 408 and form an opening between the hollow areas 412, 414 and the outside area of the rod 400.

The hollow area 412 preferably extends the length of the body portion 408 to a bottom portion 420. The bottom portion may include a first end 422 with a first opening 424 for connecting the rod 400 to a fire hydrant breakaway structure. The bottom portion also includes a second end 426 that is connected to the body portion 408. At least part of the second end 426 preferably has a diameter smaller than the body portion 408 and includes a hollow area 428 and an opening 430 between the hollow area 428 and the area outside of the rod 400. When installed into a hydrant, the rod 400 preferably allows air to flow between the area of the hydrant defined by the secondary valve and the cap structure and the area of the hydrant defined by the secondary valve and the primary valve through the openings 416, 418, and 430 and hollow areas 412, 414, and 428.

FIG. 5 shows the rod 400 in FIG. 4 with a check valve 500. The check valve 500 is preferably located in the hollow body portion 412 and hollow bottom portion 428. Alternatively, the check valve 500 may be located at any position between the body portion opening and the bottom portion opening. The check valve 500 preferably allows fluid to flow through the hollow area of the body portion in only one direction. The check valve 500 may be any type of valve that prevents the flow of liquid from the opening in the body portion to the opening in the bottom portion. A preferred type of check valve 500, as illustrated in FIG. 5, includes a spring member, a valve seat O-ring, a second O-ring, a ball, and a retaining ring.

Once installed in the rod 400, the check valve 500 is normally open and allows fluid to flow from the rod bottom portion to the rod top portion through the hollow areas. The check valve 500 preferably closes if fluid is flowing from the top portion, through the hollow portion, to the bottom portion. For example, if a miscreant, attempting to poison or otherwise damage the water supply, introduces poisonous material into the hydrant cavity through a hydrant nozzle, the poison may enter the opening of the top portion and body portion and into the hollow area of the body portion. The check valve 500 closes if the fluid pressure on the check valve 500 in the hollow portion exceeds a certain level, thereby preventing the introduced poison, or otherwise, from reaching the area of the hydrant between the secondary valve and primary valve.

Figure 6:
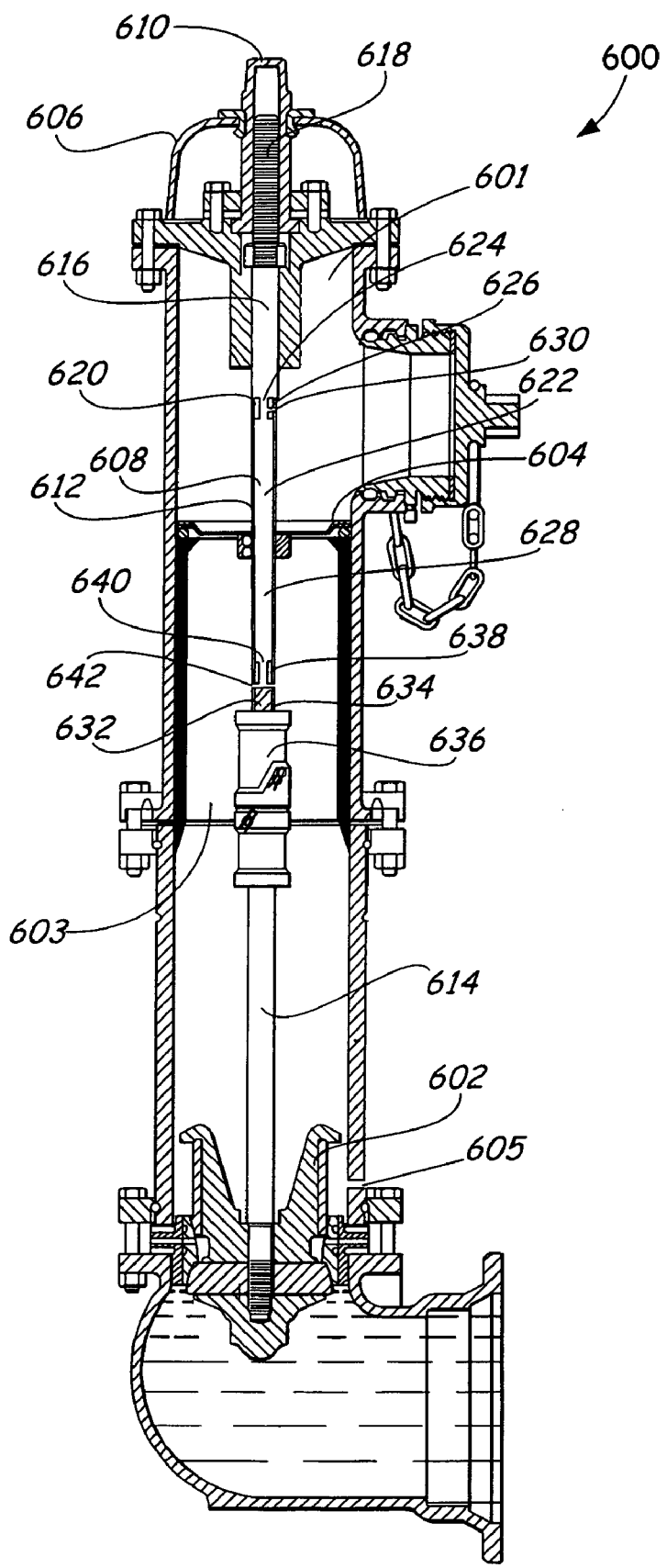
FIG. 6 shows a cross-section of a fire hydrant with the actuator rod shown in FIG. 2 according to one embodiment of the present invention.

FIG. 6 shows one embodiment of a fire hydrant 600 having a primary valve 602, secondary valve 604, a cap structure 606, and an actuator rod 608 located between the cap structure 606 and the primary valve 602. The cap structure 606 may include a nut 610 for controlling the actuator rod 608. The actuator rod 608 may include a first member 612 and a second member 614. The first rod member 612 may include a top portion 616 with a first end 618 that is preferably threaded for connecting to the cap structure 606. The top portion 616 may also include a second end 620 that is connectable to a rod body portion 622. The second end 620 preferably includes a hollow cavity 624 and an opening 626 extending from the hollow cavity 624 to the side of the second end 620.

The body portion 622 may include a hollow area 628 preferably extending the length of the body portion 622 and connected to the hollow cavity 624 of the top portion 616 to form a substantially continuous hollow area. In some embodiments of the present invention, the body portion 622 may include a opening 630 that is aligned with the opening 626 in the second end 620 when the top portion 616 and body portion 622 are connected, thereby forming an opening from the body portion hollow area 628 to the area of the fire hydrant interior cavity 601 above the secondary valve 604.

The rod first member 612 may also include a bottom portion 632 that is preferably connected to the body portion 622. The bottom portion 632 may include a first end 634 for connecting to a breakaway structure 636 and a second end 638 for connecting to the body portion 622. The second end 638 may include a hollow cavity 640 and an opening 642 extending from the hollow cavity 640 to the area of the hydrant interior cavity 603 below the secondary valve 604.

After installation into the hydrant, the openings, hollow areas, and hollow cavities preferably form a path for air to flow between the fire hydrant interior cavity above the secondary valve 601 and the area below the secondary valve 603. Therefore, water that may be in the area below the secondary valve 603 is able to drain out of the hydrant at drain opening 605.

Figure 7:
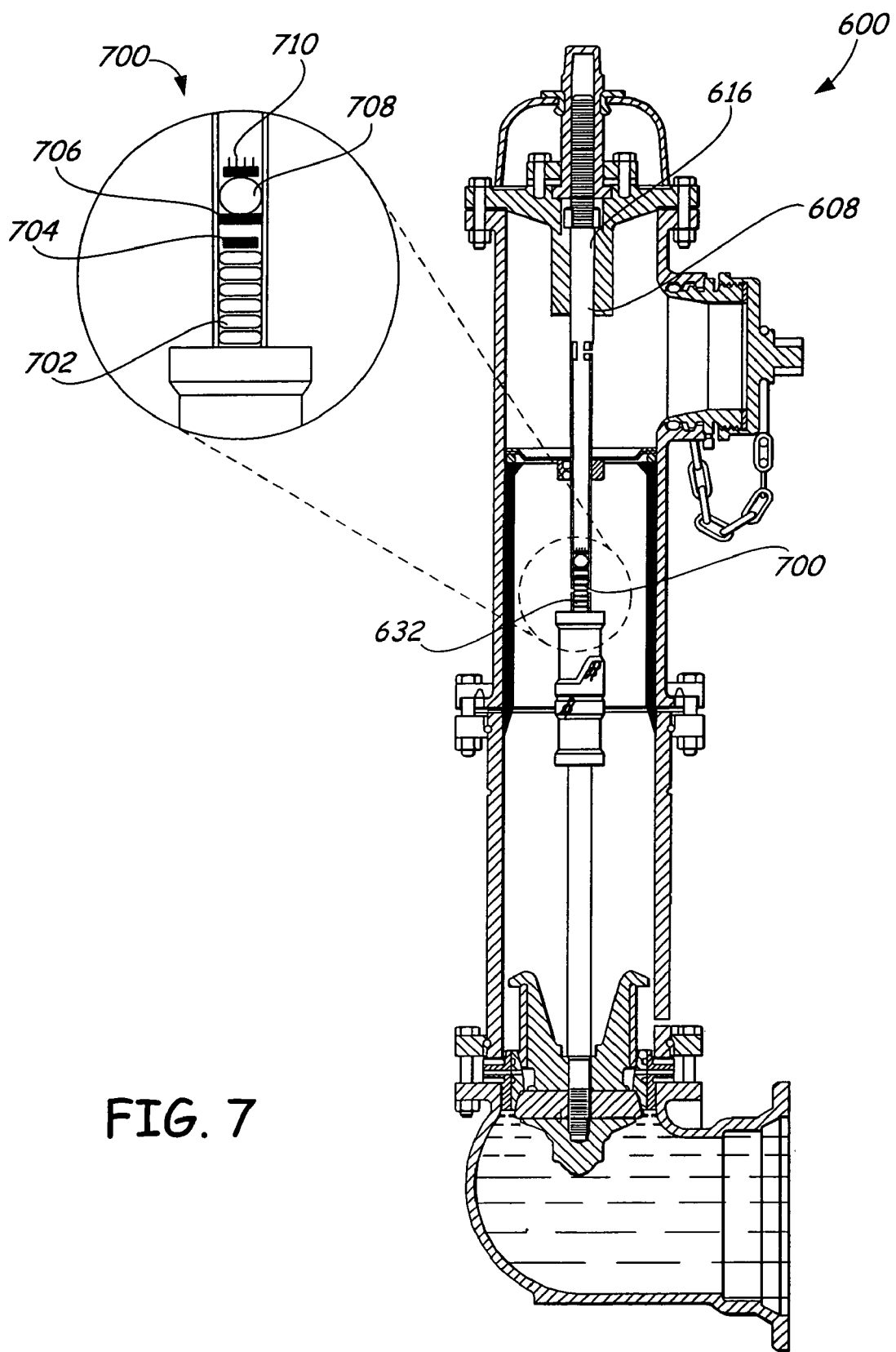
FIG. 7 shows a cross-section of a fire hydrant with the actuator rod and check valve shown in FIG. 3, according to one embodiment of the present invention.

FIG. 7 shows the fire hydrant 600 and actuator rod 608 of FIG. 6 with a check valve 700 to prevent fluid from flowing in one direction. The check valve 700 may be any type of valve that restricts the flow of fluids in one direction while allowing flow in another direction. The check valve 700 preferably includes a spring member 702, a valve seat O-ring 704, an O-ring 706, a ball 708, and a retaining ring 710. The ball 708 is preferably made of Teflon to prevent rust and prevent fluid, such as poison, from flowing from the top portion 616 to the bottom portion 632. The check valve 700 is normally open to allow fluid and air to flow, but closes after fluid pressure in the rod 608 exceeds a certain amount.

Figure 8:
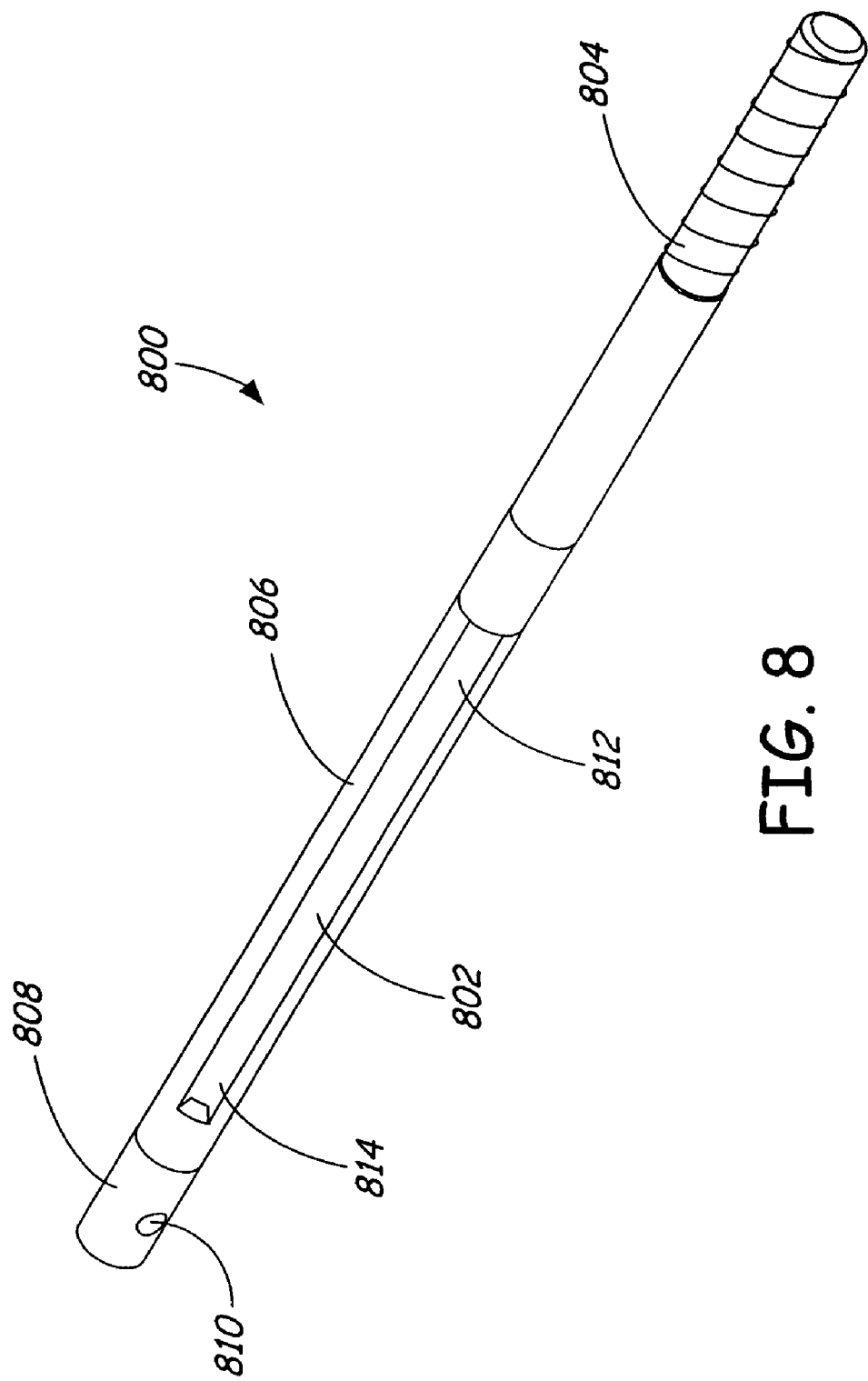
FIG. 8 shows a perspective view of a fire hydrant actuator rod having a groove according to one embodiment of the present invention.

FIG. 8 shows a fire hydrant actuator rod 800 with a groove 802 to allow air to flow between different areas of a hydrant interior according to one embodiment of the invention. The rod 800 includes a top portion 804, body portion 806, and bottom portion 808 that are preferably integrally connected. The top portion 804 may be threaded, or otherwise configured, to cooperate with a fire hydrant cap structure. The bottom portion 808 may include, for example holes 810, or any other configuration, to connect to a fire hydrant breakaway structure. The body portion 806 may include a groove 802 extending at least part of the length of the body portion 806. When the rod 800 is installed in a fire hydrant with a secondary valve, the groove 802 is preferably located such that a first area 812 of the groove is located in the area of the hydrant between the secondary valve and cap structure and a second area 814 is located between the secondary valve and breakaway structure.

Figure 9:
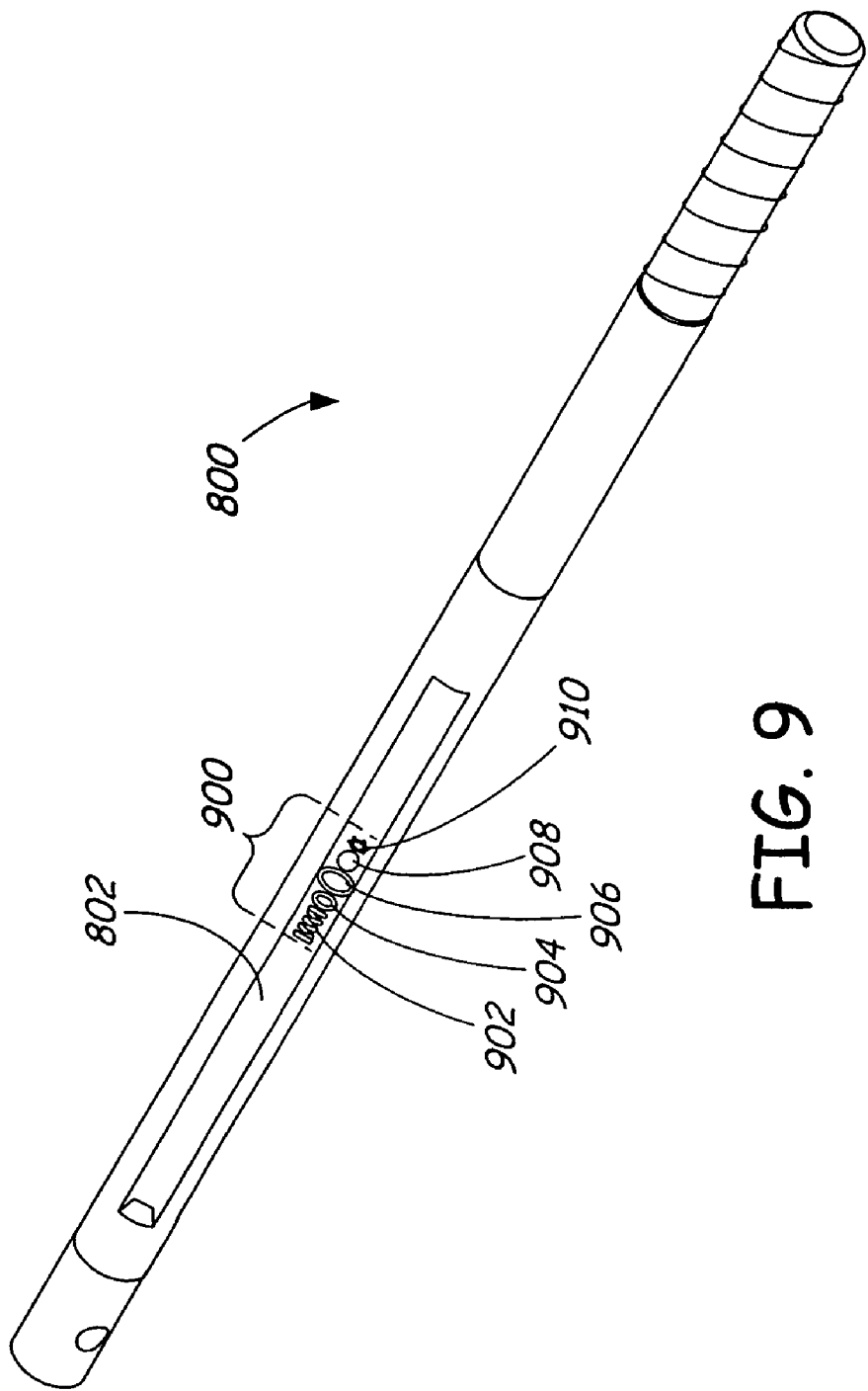
FIG. 9 shows the fire hydrant actuator rod in FIG. 8 having a check valve located in the groove.

FIG. 9 shows the actuator rod 800 of FIG. 8 with a check valve 900 preferably located in the groove 802. The check valve 900 preferably includes a spring member 902, a valve seat O-ring 904, a second O-ring 906, a ball 908, and a retaining ring 910 for preventing the flow of fluids when the pressure on one side of the check valve 900 is over a certain level. Alternatively, the check valve 900 may include any components that, when combined, prevent fluid from flowing in one direction when the pressure on one side of the check valve 900 is greater than a certain amount.

The rod 800, including the check valve 900, is preferably installed in the fire hydrant such that the groove first area 812 is located between the secondary valve and cap structure and a groove second area 814 is located between the secondary valve and breakaway structure. The check valve 900 is preferably located in the groove at the secondary valve and prevents fluid from the area of the hydrant above the secondary valve to reach the area of the hydrant below the secondary valve when the pressure in the area of the hydrant above the secondary valve is above ambient pressure by a certain amount, preferably between 0.5 and 2.0 psi.

Figure 10:
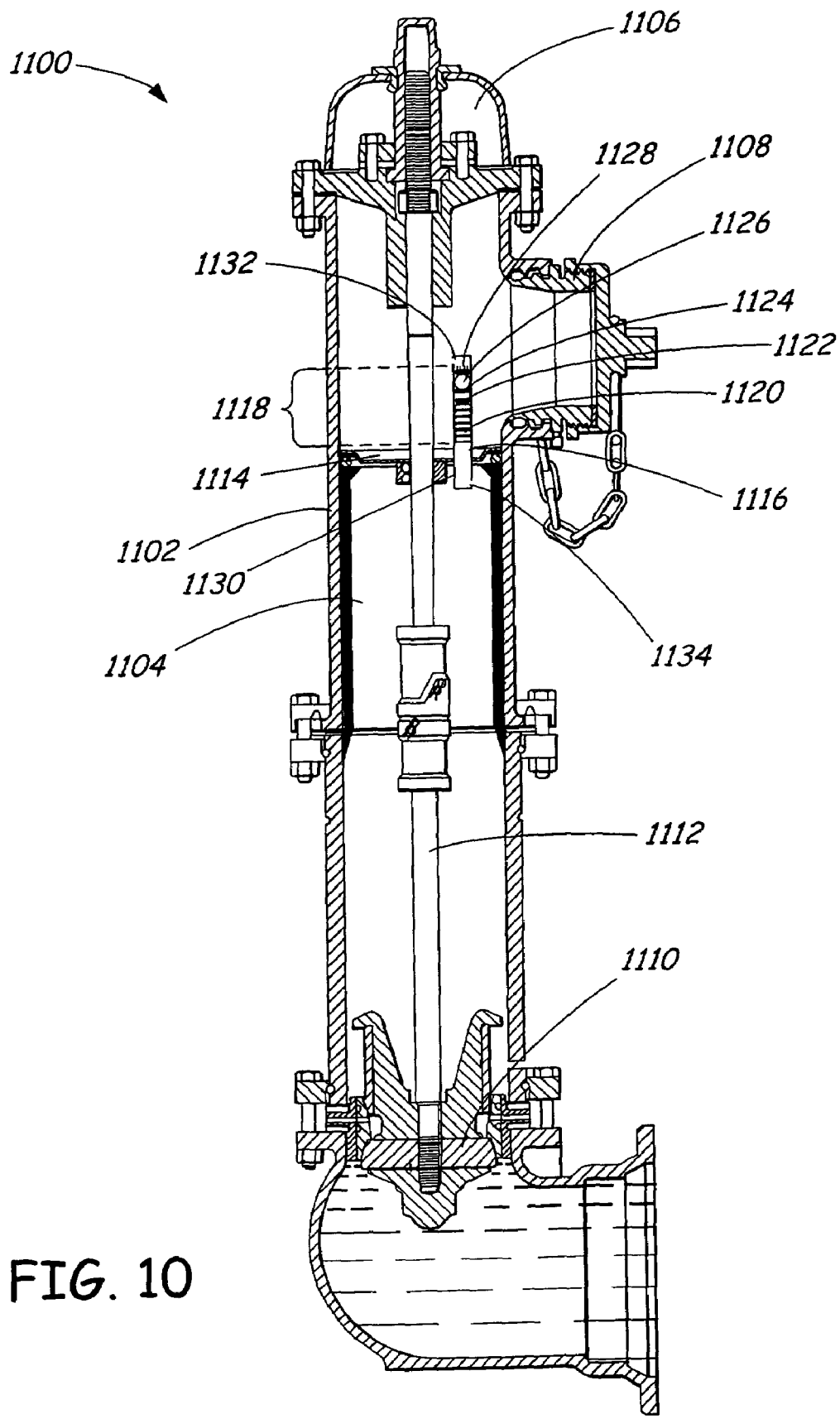
FIG. 10 shows a cross-section of a fire hydrant with a secondary valve having an opening with a check valve and check valve housing located in the opening according to one embodiment of the present invention.

FIG. 10 shows a fire hydrant 1100 having a barrel wall 1102 forming a hydrant interior 1104, a cap structure 1106, nozzle 1108, primary valve 1110, an actuator rod 1112 extending from the cap structure 1106 to the primary valve, and a secondary valve 1114. The secondary valve 1114 may have an opening 1116 in which a check valve 1118 is located to prevent the flow of fluids from the area of the hydrant interior above the secondary valve 1114 to the area of the hydrant below the secondary valve 1116 when the ambient fluid pressure in the area above the secondary valve 1114 reaches a certain level. The check valve 1118 preferably includes a spring member 1120, a valve seat O-ring 1122, a second O-ring 1124, a ball 1126, and a retaining ring 1128. Alternatively, the check valve 1118 may include any number and type of components configured to prevent the flow of fluids from the area above the secondary valve 1114 to the area below the secondary valve 1114.

In some embodiments of the present invention, the check valve 1118 may be connected to a check valve housing 1130 that may preferably be located in the secondary valve opening 1116. The check valve housing 1130 is preferably tubular with a hollow cavity and a first opening 1132 in the portion of the check valve housing 1130 that is above the secondary valve 1114 and an opening 1134 that is in the portion of the check valve housing 1130 below the secondary valve 1114. The openings 1132, 1134 preferably provide a path for air to flow between the areas of the fire hydrant interior and the hollow cavity of the check valve housing 1130 and are preferably be located on the side of the check valve housing 1130. Alternatively, the ends of the check valve housing 1130 may be essentially open, thereby allowing air to flow from the area of the hydrant above the secondary valve 1114 to the area below the secondary valve 1114.

The following is a predictive example of manufacturing a preferred fire hydrant actuator rod according to one embodiment of the present invention. An elongated Mueller Centurion steel valve stem manufactured by Mueller Co. located in Decatur, Ill. is provided that is cylindrical in shape with a cross-section diameter of 1.188 in. The rod is cut into three parts, including a top portion, body portion, and bottom portion. A cavity is bored or otherwise formed through the entire length of the body portion, creating a hollow area surrounded by a cylindrical wall with a cross-sectional diameter of 0.75 in.

A first end of the top portion is threaded for connecting to a nut of a fire hydrant cap structure. Part of a second end of the top portion is turned to a cross section diameter of 0.75 in. such that part of the second end may be inserted into the hollow cavity of the body portion. A hollow cavity is then bored into the second end. Two ⅛-inch through-holes are drilled from the outside wall of the second end to the hollow cavity 1 in. from the end of the second end. Additionally, two ⅛-inch through-holes are drilled into the sidewall of the body portion to the body hollow cavity and 1 in. from the end of the body portion in which the top portion will be attached.

A ½-inch through-hole is drilled through the sidewall of a first end of the bottom portion for connecting the rod to a fire hydrant breakaway structure with a bolt. Using a threading process the cross-section diameter of the second end is reduced to 0.88 in. The cross-section diameter allows the second end to be inserted into the body hollow cavity. A hollow cavity is bored into the second end and part of the first end, creating a hollow area defined by an outside wall. Two ¼ inch holes are drilled into the outside wall of the second member first end 2 in from the end of the piece, creating an opening from the hollow cavity of the bottom portion.

A check valve, such as TP8480 manufactured by Techwood Precision Engineering is installed in the cavities of the bottom portion and body. The bottom portion second end is inserted into the body cavity and the components are threaded together.

The top portion second end is inserted into the cavity of the body such that the holes in the body wall and top portion second end wall are aligned. The top portion is then welded to the body portion.

Once the rod is completed, it is installed in the hydrant. The rod is installed between the fire hydrant breakaway structure and cap structure. A secondary valve is located between the breakaway structure and cap structure and specifically between the hole in the body portion and the hole in the bottom portion of the rod.

When the secondary valve is closed, it prevents air or water from reaching the area of the hydrant below the secondary valve. Although the hydrant includes a drain hole near the primary valve to allow water left in the hydrant barrel after use to drain out, the secondary valve creates a vacuum in the area below the secondary valve, thereby preventing the excess water from draining out. The rod or valve stem of the present invention allow air to flow through the rod to reach the area of the barrel below the secondary valve, thereby allowing the excess water to drain through the drain hole. The check valve prevents toxins or other fluid from reaching the area of the barrel below the secondary valve by closing if the pressure on the valve exceeds 1.5 psi above ambient pressure.

What is claimed is:

1. A combination of a fire hydrant having a hydrant primary and secondary valve, and an actuator rod which is adapted to open and close at least one of the valves, the actuator rod comprising:
   a hollow portion;
   a first opening for allowing air to flow between said hollow portion and an area of the hydrant above the secondary valve;
   a second opening for allowing air to flow between said hollow portion and an area of the hydrant below the secondary valve; and
   a third opening for connecting said rod to a fire hydrant breakaway structure.

2. The combination of a fire hydrant and actuator rod of claim 1, further comprising a check valve in said hollow portion that is adapted to prevent fluids or solids from flowing through said hollow portion.

3. The combination of a fire hydrant and actuator rod of claim 2, wherein said check valve comprises a spring member, an O-ring, and a ball.

4. The combination of a fire hydrant and actuator rod of claim 2, wherein said check valve is adapted to close at an ambient pressure of 0.5 psi or greater.

5. The combination of a fire hydrant and actuator rod of claim 2, wherein said check valve is adapted to close at an ambient pressure of 1.5 psi or greater.

6. The combination of a fire hydrant and actuator rod of claim 1, wherein said first opening is ⅛-inch in diameter and said second opening is ¼-inch in diameter.

7. A fire hydrant comprising:
   a barrel adapted to communicate at least indirectly with a water conduit, the barrel comprising a breakaway structure and an interior cavity;
   a primary valve adapted to controllably restrict communication between the barrel and the water conduit;
   a cap structure having a housing cover and an operating nut;
   a secondary valve between said breakaway structure and said cap structure for controllably allowing liquid to flow through the barrel;
   a nozzle for providing access to said barrel interior;
   an actuator rod extending from said cap structure to said primary valve having a first member between said cap structure and said breakaway structure and a second member between said breakaway structure and said primary valve, said first rod member comprising:
   a top portion having a first end adapted to cooperate with said cap structure and a second end adapted to be connected to a body portion, said second end having an opening and a hollow area extending from said opening;
   a body portion having a first end, a second end, a hollow area extending the length of said body portion, and an opening at said first end adapted to be aligned with said top portion opening when said body portion and said top portion are connected;
   a bottom portion adapted to be connected to said body portion, said bottom portion having a first opening for connecting said bottom portion to said breakaway structure, a second opening, and a hollow area extending from said second opening; and
   wherein said rod is adapted to allow air to flow between said bottom portion second opening and said top portion opening.

8. The fire hydrant of claim 7, further comprising an actuator rod comprising a check valve adapted to prevent liquid from flowing through said hollow area.

9. The fire hydrant of claim 8, wherein said check valve comprises a spring member, an O-ring, and a ball.

10. The fire hydrant of claim 8, wherein said check valve is adapted to close at an ambient pressure of 0.5 psi or greater.

11. The fire hydrant of claim 8, wherein said check valve is adapted to close at an ambient pressure of 1.5 psi or greater.

12. The fire hydrant of claim 7, wherein said top portion opening is ⅛-inch in diameter and said bottom portion second opening is ¼ inch in diameter.

13. The fire hydrant of claim 7, further comprising a drain hole located below said secondary valve.

14. The fire hydrant of claim 13, wherein said drain hole is adapted to allow liquid to drain from said hydrant.

15. A fire hydrant actuator rod comprising:
   a top portion having a first end adapted to cooperate with a fire hydrant cap structure and a second end adapted to be connected to a body portion, said second end having an opening and a hollow area extending from said opening;
   a body portion having a first end, a second end, a hollow area extending the length of said body portion, and an opening at said first end adapted to be aligned with said top portion opening when said body portion and said top portion are connected;
   a bottom portion adapted to be connected to said body portion, said bottom portion having a first opening for connecting said bottom portion to said breakaway structure, a second opening, and a hollow area extending from said second opening; and
   wherein said rod is adapted to allow air to flow between said bottom portion second opening and said top portion opening.

16. The actuator rod of claim 15, further comprising a check valve adapted to prevent fluids or solids from flowing through said hollow area.

17. The actuator rod of claim 16, wherein said check valve comprises a spring member, an O-ring, and a ball.

18. The actuator rod of claim 16, wherein said check valve is adapted to close at an ambient pressure of 0.5 psi or greater.

19. The actuator rod of claim 16, wherein said check valve is adapted to close at an ambient pressure of 1.5 psi or greater.

20. The actuator rod of claim 15, wherein said top portion opening is ⅛-inch in diameter and said bottom portion second opening is ¼-inch in diameter.

21. A combination of a fire hydrant having a hydrant primary and secondary valve, and an actuator rod which is adapted to open and close at least one of the valves, the actuator rod comprising:
- a groove along at least part of the outside surface of the actuator rod, the groove having a first area and a second area, wherein after installation into the fire hydrant, the groove first area is located between the secondary valve and a fire hydrant cap structure and the groove second area is located between the secondary valve and the primary valve, the groove adapted to allow air to flow between the area of the hydrant above the secondary valve and the area below the secondary valve; and
- a check valve located in said groove to prevent fluid from flowing from the area above the secondary valve to the area below the secondary valve when the ambient pressure above the secondary valve is at or above a certain level.

22. The combination of a fire hydrant and actuator rod of claim 21, wherein said ambient pressure level is 0.5 psi or greater.

23. The combination of a fire hydrant and actuator rod of claim 21, wherein said ambient pressure level is 1.5 psi or greater.

24. The combination of a fire hydrant and actuator rod of claim 21, wherein said check valve comprises a spring member, an O-ring, and a ball.

25. The combination of a fire hydrant and actuator rod of claim 21, wherein said check valve is mechanically attached to said actuator rod.

26. A fire hydrant having a hydrant primary and secondary valve, and an actuator rod which is adapted to open and close at least one of the valves, the secondary valve comprising:
- an opening adapted to allow air to flow between the area of the hydrant above the secondary valve to the area of the hydrant below the secondary valve; and
- a check valve located in said opening and adapted to prevent fluids from flowing from the area of the hydrant above the secondary valve to the area of the hydrant below the secondary valve.

27. The fire hydrant of claim 26, further comprising a check valve housing having a hollow cavity and at least two openings and located in said secondary valve opening.

28. The fire hydrant of claim 27, wherein said check valve is attached to said check valve housing.

29. The fire hydrant of claim 27, wherein said check valve housing openings allow air to flow between the outside of said check valve housing to the hollow cavity.

30. The fire hydrant of claim 26, wherein said check valve is adapted to prevent fluids from flowing from the area of the hydrant above the secondary valve to the area of the hydrant below the secondary valve when the ambient pressure is at or above a certain level.

31. The fire hydrant of claim 26, wherein said ambient pressure level is 0.5 psi or greater.

32. The fire hydrant of claim 26, wherein said ambient pressure level is 1.5 psi or greater.

33. The fire hydrant of claim 26, wherein said check valve comprises a spring member, an O-ring, and a ball.

* * * * *